United States Patent Office 3,234,162
Patented Feb. 8, 1966

3,234,162
COMPOSITIONS COMPRISING ACRYLONITRILE POLYMERS AND SELECTED FLUOROKETONE HYDRATES
William D. Nicoll, Wilmington, Del., assignor to E. I. du Pont de Nemours and Company, Wilmington, Del., a corporation of Delaware
No Drawing. Filed Aug. 23, 1961, Ser. No. 133,297
12 Claims. (Cl. 260—29.6)

This invention relates to, and has as its principal object the provision of, novel polymer compositions comprising, as the essential ingredients thereof, acrylonitrile polymers and certain polyhalogenated ketone hydrates.

In many applications of high molecular weight polymers, such as film casting, coating, molding, use as adhevises, etc., solubility in organic solvents is a desirable property. Solubility at low or moderate temperatures, e.g., room temperature, is especially desirable in order to avoid or minimize the degradation of the polymer which often takes place when solution must be effected at high temperature to achieve a practically useful concentration of the polymer in the solvent. In addition to fluid solutions, solid or semi-solid compositions wherein the polymer is homogeneously mixed with relatively small amounts of solvent serving as plasticizer or physical modifier have great utility in polymer technology, and these also require good solubility in the solvent at room temperature.

High molecular weight polymers consisting essentially of polymerized acrylonitrile have achieved outstanding technical success, as is well known. However, these polymers are characterized by insolubility in nearly all organic solvents. They can be dissolved in certain N,N-dimethylamides, especially dimethylformamide, as described in U.S. Patent 2,404,714, but such solutions usually require relatively high temperatures for their formation and utilization, e.g., in filament spinning or film casting. Very few organic solvents are known in which solutions of high molecular weight polyacrylonitrile can be formed and used at or below room temperature.

It has now been found that certain polyhalogenated ketone hydrates have good solvent power at ordinary temperature for acrylonitrile polymers.

The new products provided by this invention are homogeneous compositions comprising, as their essential ingredients, an arcylonitrile polymer containing in the polymer molecule at least 85% by weight of polymerized acrylonitrile, and polyfluoroperhalo gem-diol having the general formula (I)        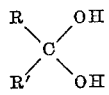

where R and R', taken singly, are perfluoroalkyl or ω-chloroperfluoroalkyl radicals of 1 to 7 carbon atoms, and taken together are the divalent hexafluorotrimethylene or chloropentafluorotrimethylene radical. In a preferred embodiment of the invention, the compositions defined above also contain small amounts of a base soluble in the gem-diol solvent, the base being an alkali metal hydroxide or an amine having a dissociation constant of at least $1 \times 10^{-9}$.

The term "ω-chloroperfluoroalkyl" has its usual meaning, i.e., it denotes a completely halogenated alkyl radical wherein all halogen atoms are fluorine except for one chlorine atom, and that at the end of the alkyl chain.

The gem-diols defined above may alternatively be referred to as hydrates of the polyfluoroperhaloketones of formula II (II)     

where R and R', which may be alike or different, have the above-stated significance. For reasons of greater effectiveness as solvents and of accessibility, the preferred polyfluoroperhaloketone hydrates are those corresponding to the polyfluoroperhaloacetones, i.e., the compounds of Formula I in which both R and R' are trifluoromethyl or chlorodifluoromethyl.

The ketone hydrates defined by Formula I are generally prepared from the corresponding ketones by treatment with water. Some of these ketones and hydrates have been reported in the literature and can be prepared by the described methods. Others are obtainable by methods described in copending patent applications, as follows.

The acyclic polyfluoroperhaloketones can be prepared, as described in U.S. Patent 3,091,643, by the reaction, in a molar ratio of at least 2:1, of an ester of a polyfluoroperhaloalkanecarboxylic acid with an alkali metal alkoxide at temperatures below about 100° C., followed by acidification with a mineral acid. This reaction gives the ketones and/or their hydrates, i.e., the gem-diols.

The polyfluoroperhalocyclobutanones, i.e., the products of Formula II where R and R' together are the divalent hexafluorotrimethylene or chloropentafluorotrimethylene radicals, can be prepared by the method described in U.S. Patent 3,129,248. This method comprises the hydrolysis with sulfuric acid of about 75–98% strength at a temperature of 125–300° C. of the 2,2-dihalo-1,3,3,4,4-pentafluorocyclobutyl hydrocarbyl ethers of the formula

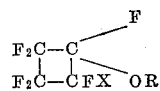

where X is fluorine or chlorine and R is a hydrocarbon radical. These ethers are themselves prepared by cycloaddition at 125–250° C. of the requisite perhaloolefin $CF_2=CFX$ and a perfluorovinyl hydrocarbyl ether $CF_2=CFOR$. The hydrolysis step yields the polyfluoroperhalocyclobutanones and/or their hydrates.

Specific polyfluoroperhalo gem-diols suitable for use in the compositions of this invention include the following:

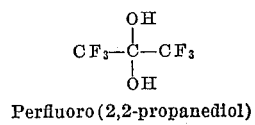

Perfluoro(2,2-propanediol)

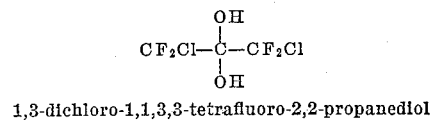

1,3-dichloro-1,1,3,3-tetrafluoro-2,2-propanediol

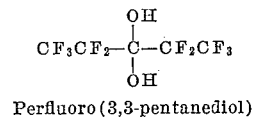

Perfluoro(3,3-pentanediol)

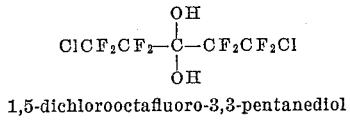

1,5-dichlorooctafluoro-3,3-pentanediol

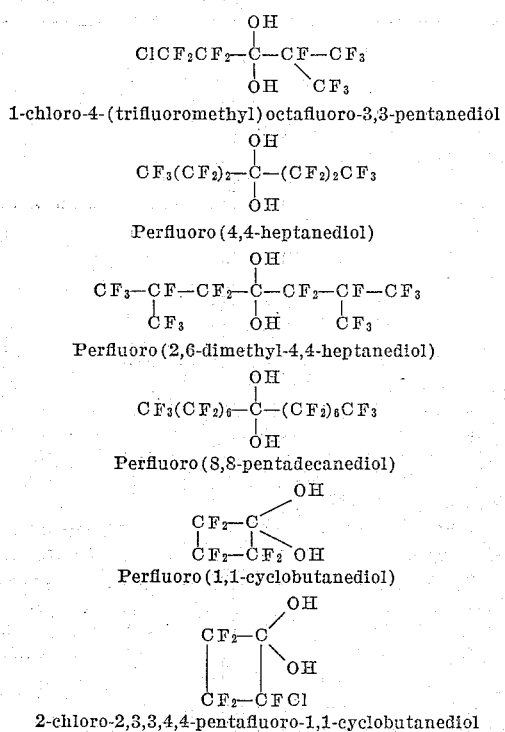

1-chloro-4-(trifluoromethyl)octafluoro-3,3-pentanediol

Perfluoro(4,4-heptanediol)

Perfluoro(2,6-dimethyl-4,4-heptanediol)

Perfluoro(8,8-pentadecanediol)

Perfluoro(1,1-cyclobutanediol)

2-chloro-2,3,3,4,4-pentafluoro-1,1-cyclobutanediol

Most of the polyfluoroperhaloketone hydrates defined by Formula I are liquids at ordinary temperature. Others are solids with relatively low melting points. Such solids, however, are entirely suitable for use in the compositions of this invention since, at or slightly above their melting point, they dissolve acrylonitrile polymers. In some cases, the solutions remain liquid at room temperature owing to the melting point-depressing effect of the solute. In other cases, they solidify to solid solutions, which can be reliquefied readily on warming when a fluid solution is needed. Furthermore, the normally solid ketone hydrates are suitable for the preparation of solid, homogeneous blends with the polymer, to which they impart plasticizing or softening effects. Some polyfluoroperhaloketone hydrates are capable of forming more or less well defined higher hydrates containing from about 0.5 to about 1.5 moles of additional water. Such higher hydrates are usually liquid at room temperature or below and they are suitable for the purposes of this invention.

The polymers with which this invention is concerned are the high molecular weight, essentially linear acrylonitrile polymers containing at least 85% by weight of polymerized acrylonitrile. Such polymers include, in addition to polyacrylonitrile itself, acrylonitrile copolymers wherein at most 15% by weight of the polymer molecule is the polymerization product of one or more different polymerizable monomers. Among such monomers may be mentioned the esters, nitriles and amides of acrylic and 1-alkylacrylic acids such as methyl acrylate, ethyl acrylate, methyl methacrylate, methacrylonitrile, and acrylamide; the chloro- and fluoroethylenes such as vinyl chloride, vinyl fluoride, vinylidene fluoride or chlorotrifluoroethylene; the vinyl carboxylates such as vinyl acetate or vinyl butyrate; the ethylenically unsaturated hydrocarbons such as styrene, isobutylene or 1,3-butadiene; the ethylenically unsaturated carboxylic or sulfonic acids such as acrylic acid or styrene sulfonic acid; vinyl pyridine; and the like. The acrylonitrile polymer preferably has a molecular weight of at least 15,000, generally between 15,000 and 250,000.

It has been found that the rate of solution of the acrylonitrile polymer in the gem-diol solvent is increased, and that the resulting solutions retain their initial viscosity on prolonged standing, if a small amount of a compatible or soluble base is added to the solvent. Compositions containing this added ingredient are therefore preferred, although its presence is by no means essential. Bases which have been found most effective in promoting solution of the acrylonitrile polymer are the primary, secondary or tertiary amines having a dissociation constant of at least $1 \times 10^{-9}$, examples of which are triethylamine, pyridine, piperidine, diethylamine, n-butylamine, hexamethylenediamine, ethylenediamine, tri-n-butylamine, diethanolamine and cyclohexylamine. Alkali metal hydroxides, e.g., sodium and potassium hydroxide, also promote solution, though they are less effective than the organic bases. In general, the base is used in amounts between 0.02 and 0.1 mole per mole of polyfluoroperhaloketone hydrate.

The polymer-solvent mixtures of this invention are homogeneous, single-phase compositions. From the standpoint of physical characteristics, they comprise solid compositions in which the polymer is plasticized or otherwise modified with minor amounts of the polyfluoroperhalo gem-diol, which may be as low as 0.5% by weight of the polymer, i.e., a weight ratio of 0.005:1; semi-solid compositions, in which the polymer has incorporated therein sufficient amounts of the gem-diol to make it readily deformable; highly viscous solutions; and fluid solutions, which can contain as much as 10,000% of the gem-diol by weight of the polymer, i.e., a weight ratio of 100:1. In general, the most useful compositions, which may be fluid or solid at room temperature, are those containing the polyfluoroperhalo gem-diol and the polymer in weight ratios between 1:1 and 50:1.

The compositions can contain more than one polyfluoroperhalo gem-diol solvent. Compositions, and especially fluid solutions, which comprise, in addition to the gem-diol solvent, an organic liquid miscible therewith but which is a nonsolvent for the polymer, are also within the scope of this invention. Such compositions sometimes offer technical advantages, e.g., they may lend themselves better to the formation of shaped objects, by extrusion or casting. Water may also be present in minor amounts, insufficient to destroy the homogeneity of the composition. The water, for example, may be that present in the already mentioned perhaloketone higher hydrates, such as the compound corresponding in composition to $(CF_3)_2C(OH)_2 \cdot \frac{1}{2} H_2O$. Even somewhat higher amounts of water, up to about 1½ moles per mole of the polyfluoroperhalo gem-diol, can be tolerated. In some cases, addition of a little water liquefies a normally solid polyfluoroperhalo gem-diol and thus permits forming fluid solutions or homogeneous compositions at temperatures lower than the melting point of the water-free gem-diol.

The compositions can, of course, contain various nonessential ingredients such as resins, waxes, antioxidants, corrosion inhibitors, acid acceptors, ultraviolet light absorbers, fillers and other additives.

A remarkable aspect of this invention is the fact that solutions of acrylonitrile polymers in normally liquid polyfluoroperhaloketone hydrates are best formed at low temperatures rather than at elevated temperatures. It has unexpectedly been found that the preferred temperature range for the preparation of such solutions is 0–50° C., and still more preferably 0–25° C. In fact, the solubility of the acrylonitrile polymer increases with a decrease in temperature from about 25° C. to about 0° C., this "reverse temperature effect" being especially marked when small amounts of a base are present in the solvent. In some cases the polymer even tends to coagulate when the solution is warmed appreciably above about 50° C. However, with the normally solid polyfluoroperhaloketone hydrates, solution can be effected at or just above the melting point of the solvent. It is, of course, an advantageous feature of this invention that the polymer/solvent compositions, especially fluid solutions, can be formed, and remain stable (i.e., do not precipitate) at room temperature or below, since the subsequent uses of these compositions, e.g., in casting, coating, extruding, etc., are thereby greatly facilitated.

The following examples illustrate specific embodiments of the invention.

*Example I*

Polyacrylonitrile in the form of commercially available fibers was dissolved at approximately 5% concentration by weight in s-dichlorotetrafluoroacetone hydrate, i.e., 1,3-dichloro-1,1,3,3-tetrafluoro-2,2-propanediol. The polymer formed a solution at room temperature (20–25° C.) and it was observed that solubility increased with a decrease in temperature from room temperature to about 0° C. The solutions were stable at room temperature and could readily be cast to clear polyacrylonitrile films. When warmed to above about 50° C., the solutions showed a tendency to coagulate.

*Example II*

Solutions of polyacrylonitrile in s-dichlorotetrafluoroacetone hydrate were prepared as in Example I except that small amounts, of the order of 1–5% by weight, of triethylamine were added to the solvent. This addition was found to increase the rate of solution of the polyacrylonitrile at temperatures of approximately 0° C. Moreover, there was no impairment in the quality of films cast from such solutions. Thus, in one such preparation, a mixture consisting, by weight, of 4% of polyacrylonitrile, 94% of s-dichlorotetrafluoroacetone hydrate and 2% of triethylamine was stirred with cooling to about 0° C. Clear, strong films were formed by casting the resulting solution onto either a polished chrome plate or a glass plate and evaporating the solvent at room temperature.

In similar tests, the following bases were found to increase the rate of solution of polyacrylonitrile in s-dichlorotetrafluoroacetone hydrate when added in amounts of 0.02 to 0.1 mole per mole of solvent: pyridine, piperidine, diethylamine, n-butylamine, hexamethylenediamine, tri-n-butylamine, diethanolamine and aqueous sodium hydroxide.

*Example III*

Two copolymers having the following compositions, by weight:

(1) Acrylonitrile 94%, methyl acrylate 6%
(2) Acrylonitrile 93.65%, methyl acrylate 5.98%, styrene sulfonic acid 0.37% were stirred at room temperature with s-dichlorotetrafluoroacetone hydrate containing approximately 1% by weight of triethylamine, the weight ratio of solvent to polymer being 95:5. Smooth, clear solutions resulted. These solutions were cast onto glass plates and clear, tough films were obtained by evaporating the solvent at room temperature.

*Example IV*

Solutions were prepared containing about 5% by weight of polyacrylonitrile in s-dichlorotetrafluoroacetone hydrate plus 2% of triethylamine. These solutions were used as follows to impregnate various porous materials.

(a) Filter paper was dipped in the solution and the solvent was removed by evaporation at room temperature. The paper showed substantially improved wet strength but it was in other respects similar to the untreated paper.

(b) A nonwoven fabric composed of melt spun polyethylene fibers formed into a mat and calendered hot was coated by application of the solution with a doctor knife, followed by evaporation of the solvent at room temperature. The coated fabric had improved strength as compared with the untreated fabric.

*Example V*

Solutions containing about 5% by weight of polyacrylonitrile were prepared in:

(1) Hexafluoroacetone monohydrate, i.e., perfluoro-2,2-propanediol, $CF_3-C(OH)_2-CF_3$. This solution was made at the melting point of the alcohol, 45° C. It remained liquid at room temperature.

(2) Hexafluoroacetone 1.5 hydrate, i.e., $$CF_3-C(OH)_2-CF_3 \cdot \tfrac{1}{2}H_2O$$

This solution was made at room temperature, where this higher hydrate is liquid.

Both solutions were cast onto glass plates and the solvent was evaporated at room temperature. Clear, tough films were obtained in both cases.

*Example VI*

A mixture was prepared of about 5 parts by weight of a 94/6 acrylonitrile/methyl acrylate copolymer and 95 parts by weight of an equimolar mixture of perfluoro(1,1-cyclobutanediol) and water, the latter serving to liquefy the perfluoroalcohol. The polymer dissolved at room temperature. The solution was used to coat a wood panel. After evaporation of the solvent, a clear, hard protective film was left on the wood surface.

Similar results were obtained using the same copolymer and solvent mixtures consisting of 2-chloro-2,3,3,4,4-pentafluoro-(1,1-cyclobutanediol) to which had been added 0.5 and 1.0 mole of water, respectively.

*Example VII*

The copolymer of Example VI was dissolved at about 5% concentration in 1,3-dichloro-1,1,3,3-tetrafluoro-2,2-propanediol at room temperature. The solution was used to coat steel and aluminum panels. Evaporation of the solvent left clear, hard, adherent coatings on the metal surfaces.

The compositions of this invention have many and varied technical applications. The foregoing examples have illustrated some of their uses, including the preparation of films and coatings on various surfaces and the impregnation of paper and fabrics. Fluid polymer solutions are further eminently suitable for many other uses, such as solution spinning of filaments, rods or tubes, wire coating, etc. Solutions of suitable viscosity are useful as adhesives to join together surfaces such as wood, metals, ceramics, plastics, etc. Solid plasticized compositions containing minor amounts of polyfluoroperhaloketone hydrate solvents are suitable as molding powders for use in the fabrication of shaped objects, for example by injection molding or compression molding, or by melt extrusion into films, rods, tubes and other shapes.

Since obvious modifications and equivalents in the invention will be evident to those skilled in the chemical arts, I propose to be bound solely by the appended claims.

The embodiments of the invention in which an exclusive property or privilege is claimed are defined as follows:

1. A composition of matter comprising
   (1) a polymer containing in the polymer molecule at least 85% by weight of polyacrylonitrile and
   (2) a polyfluoroperhalo gem-diol having one of the general formulae selected from the group consisting of

and

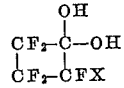

wherein:
   R and R' are selected from the group consisting of perfluoroalkyl of up to 7 carbon and ω-chloroperfluoroalkyl of up to 7 carbons, and
   X is selected from the group consisting of fluorine and chlorine.

2. The composition of matter of claim 1 comprising additionally a base of the group consisting of alkali metal hydroxides and amines having a dissociation constant of at least $1 \times 10^{-9}$.

3. The composition of matter of claim 1 comprising additionally water.

4. A solution of a polymer containing in the polymer molecule at least 85% by weight of polyacrylonitrile in 1,3-dichloro-1,1,3,3-tetrafluoro-2,2-propanediol.

5. The solution of claim 4 comprising additionally about 1–5% by weight, based on the weight of solvent, of a member of the group consisting of alkali metal hydroxides and amines having a dissociation constant of at least $1 \times 10^{-9}$.

6. The solution of claim 4 comprising additionally about 1–5% by weight, based on the weight of solvent, of triethylamine.

7. A solution of a polymer containing in the polymer molecule at least 85% by weight of polyacrylonitrile in perfluoro-2,2-propanediol.

8. A solution of a polymer containing in the polymer molecule at least 85% by weight of polyacrylonitrile in hexafluoroacetone 1.5 hydrate.

9. A solution of a polymer containing in the polymer molecule at least 85% by weight of polyacrylonitrile in perfluoro(1,1-cyclobutanediol) and water.

10. A solution of a polymer containing in the polymer molecule at least 85% by weight of polyacrylonitrile in 2-chloro-2,3,3,4,4-pentafluoro(1,1 - cyclobutanediol) and water.

11. The method of enhancing the solubility of a polymer containing in the polymer molecule at least 85% by weight of polyacrylonitrile in a polyfluoroperhalo gem-diol having one of the general formulae selected from the group consisting of

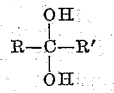

and

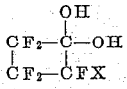

wherein:
R and R' are selected from the group consisting of perfluoroalkyl of up to 7 carbons and ω-chloroperfluoroalkyl of up to 7 carbons, and
X is selected from the group consisting of fluorine and chlorine, which comprises incorporating in said gem-diol about 1–5% by weight, based on the weight of the gem-diol, of a member of the group consisting of alkali metal hydroxides and amines having a dissociation contant of at least $1 \times 10^{-9}$.

12. The method of claim 11 in which triethylamine is incorporated in the gem-diol.

References Cited by the Examiner

UNITED STATES PATENTS

| | | | |
|---|---|---|---|
| 2,941,972 | 6/1960 | De Witt | 260—33.4 |
| 3,153,004 | 10/1964 | Middleton | 260—33.4 |

MURRAY TILLMAN, *Primary Examiner.*

LEON BERCOVITZ, *Examiner.*